(12) United States Patent
Scott (10) Patent No.: US 7,245,941 B2
(45) Date of Patent: Jul. 17, 2007

(54) MOBILE TELECOMMUNICATIONS DEVICE (75) Inventor: Suzanne Scott, Erskine (GB)

(73) Assignee: Nokia Corporation, Espoo (FI)

( * ) Notice: Subject to any disclaimer, the term of this patent is extended or adjusted under 35 U.S.C. 154(b) by 335 days.

(21) Appl. No.: 10/022,220

(22) Filed: Dec. 20, 2001

(65) Prior Publication Data

US 2002/0077158 A1 Jun. 20, 2002

(30) Foreign Application Priority Data

Dec. 20, 2000 (GB) ................................ 0031075.5

(51) Int. Cl.
*H04B 1/38* (2006.01)

(52) U.S. Cl. ...................... 455/566; 455/567; 455/415; 379/201; 379/204

(58) Field of Classification Search ................ 455/414, 455/422, 566, 415; 379/201, 204, 205, 215
See application file for complete search history.

(56) References Cited

U.S. PATENT DOCUMENTS

| 5,574,773 A | * | 11/1996 | Grob et al. ................. 455/466 |
| 5,999,827 A | * | 12/1999 | Sudo et al. ................. 455/564 |
| 6,070,068 A | * | 5/2000 | Sudo ........................ 455/414.1 |
| 6,154,644 A | * | 11/2000 | Murray .................... 455/414.1 |
| 6,349,220 B1 | * | 2/2002 | Prior et al. ................. 455/566 |
| 6,408,177 B1 | * | 6/2002 | Parikh et al. ............. 455/414.4 |
| 6,574,471 B1 | * | 6/2003 | Rydbeck ..................... 455/418 |
| 6,757,372 B1 | * | 6/2004 | Dunlap et al. ......... 379/142.17 |

FOREIGN PATENT DOCUMENTS

| DE | 199 28 860 A1 | 12/2000 |
| EP | 0 633 684 A2 | 1/1995 |
| EP | 0 998 102 A1 | 5/2000 |
| GB | 2 335 822 | 9/1999 |
| WO | WO 95/25397 | 9/1995 |

* cited by examiner

*Primary Examiner*—Matthew Anderson
*Assistant Examiner*—Minh Dao
(74) *Attorney, Agent, or Firm*—Banner & Witcoff, Ltd.

(57) ABSTRACT

The present invention relates to a mobile telecommunications device such as a mobile telephone 1. The device includes a display (5) and a control unit (4,10,11,12) configured to display a menu of pending calls, one call being selectable from the menu by a user to display a sub-menu listing call handling options associated with the selected call.

20 Claims, 10 Drawing Sheets

MOBILE TELECOMMUNICATIONS DEVICE

FIELD OF THE INVENTION

The present invention relates to the field of mobile telecommunications devices and, in particular, to mobile telephones.

BACKGROUND OF THE INVENTION

A mobile telephone incorporates a liquid crystal display to provide its user with information concerning the status of the telephone and to enable a large number of different functions to be accessed and selected easily. As the display is usually fairly small, only very limited information can be displayed on it at the same time otherwise it becomes cluttered and difficult to read. Therefore, to select a particular function, the user generally needs to access one or more menus listing various options. By selecting one of those options the function may be performed or a sub-menu may appear listing further options specifically associated with the initial menu selection.

A disadvantage with a conventional mobile telephone having a small display is that for many functions there are a considerable number of different options listed in each menu or sub-menu only part of which can be displayed at once. To view the remaining options listed in the menu or sub-menu, the user must scroll down the list so that those at the top of the list disappear off the top of the screen and those at the bottom of the list come into view. Although this arrangement works fairly well, sometimes it is desirable to be able to see the whole menu or sub-menu to avoid confusion and improve functionality and ease of use. Confusion particularly occurs when multiple calls are received simultaneously as the list of call handling options for a plurality of calls becomes very long. Furthermore, although active voice calls, waiting voice calls, held voice calls and data calls may have individual options specific to that particular type of call, some options apply to all types of calls and it can be difficult for the user to easily remember which option applies to which call especially when active, held and waiting calls are all pending simultaneously and this leads to call handling errors It is also slower for the user to access the required option as the menu listing all the options for these calls is very long and so the user sometimes has to scroll through a large number of options before the required option is located.

Some conventional mobile telephones have attempted to solve this problem by referencing an active call with an index number that appears on the display together with the list of all the different call options for each call so that the user can tell whether the option they select will apply to the active call. However, to show the status of all calls when there are several active at once, index numbers for each call would have to be displayed. This makes the display too cluttered and it therefore becomes even harder to read. This problem will become more significant in the future when telephones capable of handling even more pending calls at the same time are developed.

A common problem with call handling multiple calls is the function performed by the "End" key which is generally used to terminate a call. However, in circumstances where there are multiple pending calls, it is not immediately apparent to a user which call they are terminating when the "End" key is actuated. Again, this renders the call handling facility difficult to use and prone to user error.

SUMMARY OF THE INVENTION

It is an object of the present invention to overcome or alleviate the problems mentioned above and expand the flexibility of call handling.

According to the present invention, there is provided a mobile telecommunications device including a display and a control unit configured to display a menu of pending calls, one call being selectable from the menu by a user to display a sub-menu listing call handling options associated with the selected call.

Preferably, the list of options in a sub menu changes depending on the status of pending calls in the menu. The status of the calls may be identified in the menu and the status of the selected call may also be identified in the sub-menu.

The call selected from the menu is conveniently identified on the sub-menu adjacent the list of options associated with the selected call.

In a preferred embodiment, the control unit is configured to display the status of each pending call in the menu.

The control unit advantageously includes a scroll key and an option key configured such that the user can highlight a pending call in the menu using the scroll key and select said highlighted call by pressing the option key.

Preferably, the control unit additionally includes a selection key having a function dependent on the status of the highlighted call when the menu of pending calls is displayed.

In another embodiment, the control unit includes a selection key having a function dependent on the status of other pending calls when the menu of pending calls is displayed.

The function associated with the selection key may, advantageously, be performed by actuating the selection key after highlighting a call in the menu and before selecting that call to display a sub-menu listing call handling options associated with the selected call.

The mobile telecommunications device is, according to a preferred embodiment, a mobile telephone.

The present invention also provides a method of handling multiple calls in a mobile telecommunications device including a display and a control unit configured to display a menu of pending calls, the method including the step of selecting a pending call from the menu to display a sub-menu listing call handling options associated with the selected call.

The control unit includes preferably includes a scroll key and the step of selecting a pending call from the menu includes operating the scroll key to highlight a call in the menu.

In a preferred embodiment, the control unit includes an option key and the step of selecting a call from the menu includes operating the option key to display the sub-menu listing call handling options associated with the highlighted call.

Preferably, the control unit includes a selection key having a function dependent on the status of the highlighted call when the menu of pending calls is displayed, the method including the step of actuating the selection key after highlighting a call in the menu and before selecting that call to display a sub-menu listing call handling options associated with the selected call.

DETAILED DESCRIPTION OF THE PREFERRED EMBODIMENTS

Embodiments of the invention will now be described, by way of example only, with reference to the accompanying drawings.

The general components and operation of a mobile telephone 1 will now be described with reference to FIGS. 1 and 2. The telephone 1 has a front casing portion 2 and a rear casing portion 3. A user interface is provided in the front casing portion 2 and includes a display 5, an ear-piece 6, a microphone 7, and a control unit comprising an on/off key 8, a keypad 4 a scroll key 9. The telephone 1 is adapted for communication via a wireless telecommunications network, e.g. a cellular network. However, the telephone 1 could also have been designed for a cordless network. The keypad 4 has a first group of keys which are alphanumeric and by means of which a user can enter a telephone number, write a text message (SMS) or write a name associated with a particular number, etc.

The keypad 4 additionally includes three soft keys 10, 11,12. The first soft key 10 is an "End" key and is used for terminating or dropping calls. The second soft key 11 is an "Option" key and is used to call up menus from which the required function can be selected. The third soft key or middle soft key 12 is a selection key and its function changes depending on the status that the telephone is in and on what is shown on the display 5. The function of these three soft keys 10,11,12 will become more apparent from the description that follows. The scroll key 9 is used for moving a highlight bar 28 (see below) over a particular item listed in a menu to enable it to be selected and performed or a sub-menu of options relating to that item to be displayed for subsequent highlighting and selection of a particular option.

Figure 2:
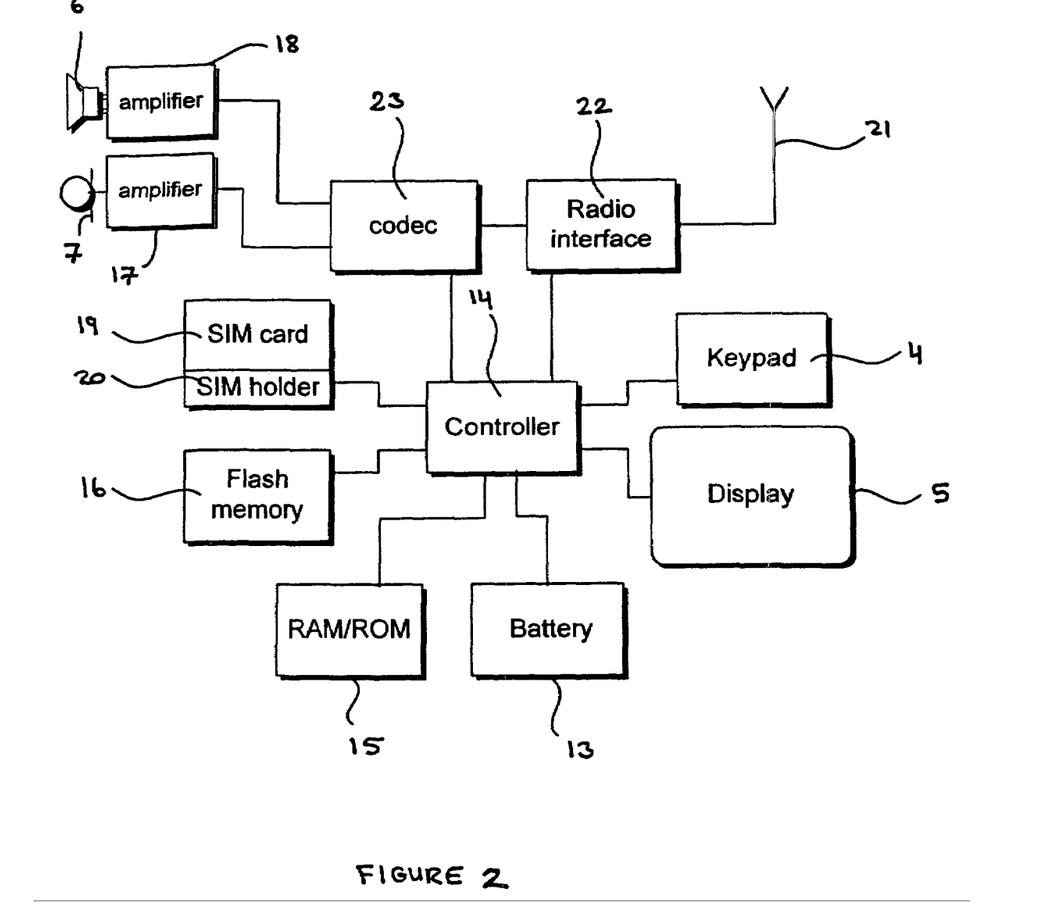
FIG. 2 is a schematic illustration of the main components of the mobile telephone illustrated in FIG. 1.

FIG. 2 illustrates the main parts of the telephone 1 which is adapted for use in connection with a GSM network or any other mobile telephone network and may also be configured to meet the wireless application protocol specification (WAP). The telephone 1 is driven by a removable battery pack 13. Signal processing is carried out under the control of a digital microcontroller 14 which has an associated RAM/ROM 15 and a flash memory 16. Electric analog signals are produced by microphone 7 and amplified by pre-amplifier 17. Similarly, analog audio signals are fed to ear piece 6 through amplifier 18. The micro controller 14 receives instruction signals from the keypad 4 including the soft keys 10,11,12 and controls the operation of the display 5. Radio signals are transmitted and received by means of an antenna 21 connected through an rf stage 22 to a codec 23 configured to process signals under the control of the micro-controller 14. Thus, in use, for speech, the codec 23 receives analogue signals from microphone amplifier 17, digitizes them into a form suitable for transmission and feed them to the rf stage 22 for transmission through antenna element 2 to the public land mobile network (PLMN). Similarly, received signals are fed to codec 23 so as to produce analog signals fed to amplifier 18 and ear piece 6.

Figure 1:
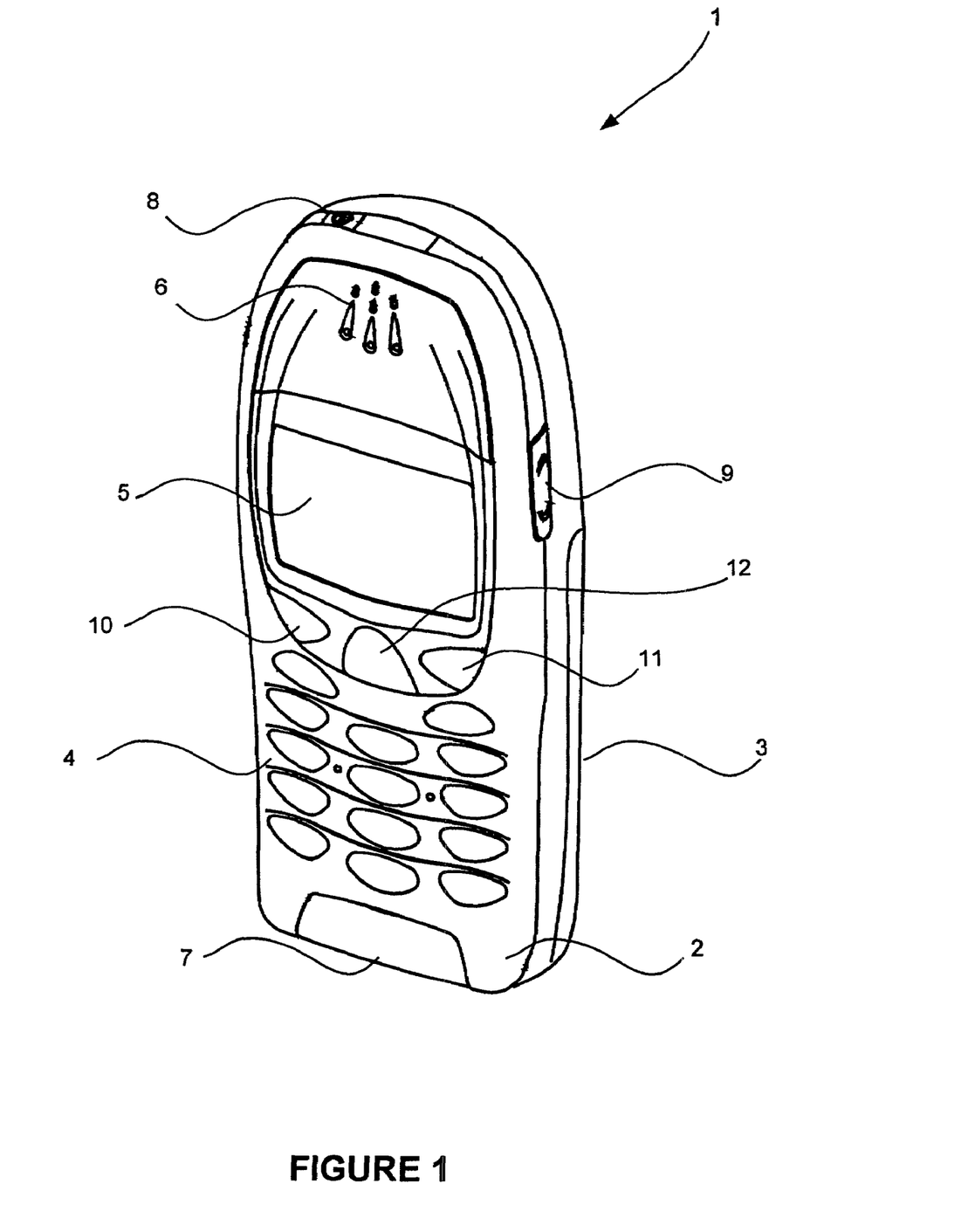
FIG. 1 is an illustration of the front perspective view of a mobile telephone for connection to a cellular or cordless network.
Figure 3A:
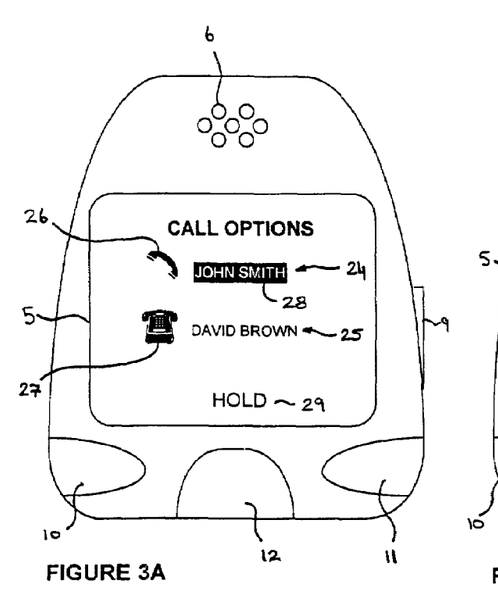
FIGS. 3A and 3B illustrate a partial view of the front casing of the mobile telephone shown in FIG. 1 showing a typical screen display when there is a pending answered and unanswered waiting call, the answered call being highlighted in FIG. 3A and the unanswered call being highlighted in FIG. 3B.
Figure 3B:
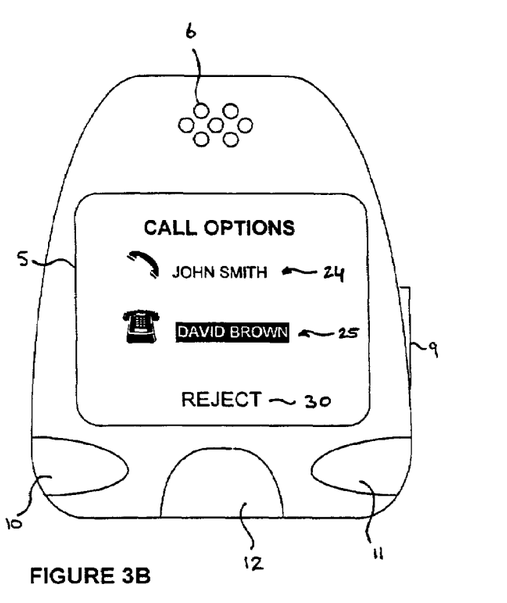
Figure 4A:
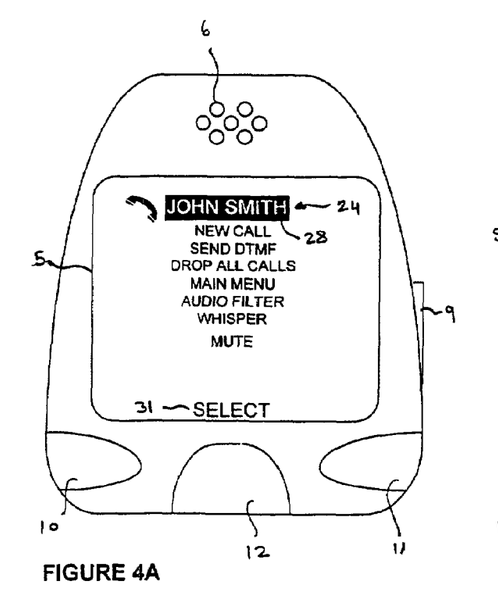
FIG. 4A shows the same view as FIG. 3A following activation of the "option key"
Figure 4B:
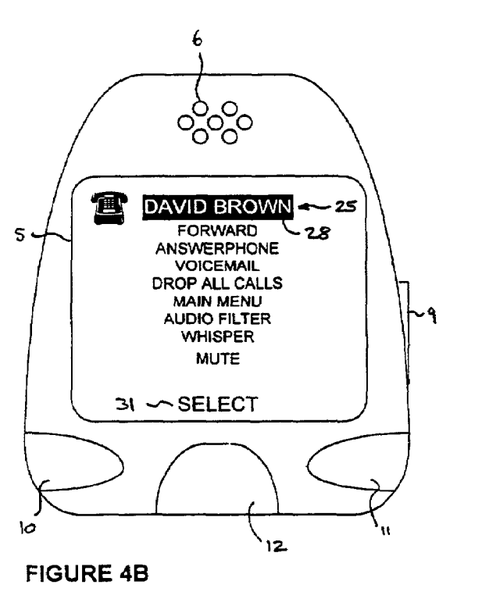
FIG. 4B illustrates the same view as FIG. 3B following activation of the "option key"

Referring now to FIGS. 3 and 4, there is shown a partial view of the front face of the mobile telephone 1 illustrated in FIG. 1 in which only the display 5, the three soft keys 10,11,12 and the scroll key 9 are visible. A call status screen is shown on the display from which a user can determine that there are two pending calls, an active answered call 24 from "John Smith", and an unanswered waiting call 25 from "David Brown".

The status of each call, i.e. whether it is an active answered call, a waiting call or a held call is designated graphically in each screen shot by an icon which clearly designate the status of a call without unduly cluttering up the display 5. For example, in the figures, a graphical representation of a telephone receiver 26 represents an active answered call 24, a graphical representation of a telephone receiver 26 positioned just above a telephone cradle 27 represents a held call, and a graphical representation of a telephone receiver 26 in position on a telephone cradle 27 represents an unanswered waiting call 25. It will be appreciated that any other means of clearly designating the status of each call may be used instead.

In FIG. 3A, the answered call 24 is shown highlighted by highlight bar 28, i.e. the colour of the font and the background surrounding the name "John Smith" is reversed. This is achieved by actuating the scroll button 9 until the highlight bar 28 is positioned over the desired name. As "John Smith" is an answered call 24, activating the middle soft key or selection key 12 whilst the highlight bar 28 is located over this call will "hold" the call 24 from "John Smith", as shown by the function indicator 29 which appears at the bottom edge of the display 5 above the selection key 12 in FIG. 3A when the highlight bar 24 is positioned over an answered call 24.

In FIG. 3B, the unanswered waiting call 25 from "David Brown" is shown with the highlight bar 28 positioned over it. In this case, activating the selection key 12 will "reject" the waiting call from "David Brown" as shown by the function indicator 30 which appears at the bottom edge of the display 5 above the selection key 12 when the highlight bar 28 is positioned over a waiting call.

From the foregoing, it will be appreciated that the function of the selection key 12 changes depending on the status of the highlighted call 28. It will also become apparent that the function of the selection key 12 may also depend on the status of any of the other remaining calls. The idea being that the selection key 12 has the most widely used function attributed to it for the type of call that is highlighted and the remaining pending calls listed in the call status menu. In the present case, the most frequently required handling option for an active call, when there is a pending active and waiting call, is to "hold" the active call so that the waiting call can be answered, whereas the most frequently required handling option for a waiting call, when there is a pending active and waiting call, is to "reject" the waiting call so that the answered call can be continued without interruption. This dynamic changeable function of the selection key 12 provides quicker access to the most widely used options specific to a type of call and other pending calls listed on the call status screen.

FIG. 4A represents the same partial view of the telephone as illustrated in FIG. 3A following actuation of the option key 12. It can now be seen that the display 5 shows a sub-menu of options listing a number of features which are specific to the answered active call 24 from "John Smith" such as "new call"; "send DTMF"; "Drop all calls" and "Main menu". It will be appreciated that the "hold" feature does not appear in the list of sub-menu options, as this feature is quickly accessed by actuating the selection soft key 12, as previously described, so there is no need for it to appear in the sub-menu options. Other options relevant to the operation of the telephone rather than the calls themselves are also listed in the sub-menu, examples of these are "audio filter"; "whisper" and "mute". It will be appreciated that all the sub-menu options fit on a single screen shot and there is no need to actuate the scroll key 9 to see further options not visible on the display 5, as in the case of a conventional telephone in which all the call handling options for all the calls are listed in the same menu. The scroll key 9 is used to highlight a particular option in the sub-menu list. Furthermore, the user knows exactly which options apply to which call as the name and status of the caller 24 remains at the top of the display 5 when the sub-menu is displayed.

Once the sub-menu is displayed, the user may activate a particular function by pressing the scroll key 9 to move the highlight bar 28 over the required option and by pressing the selection key 12. It will be apparent that when a sub-menu is displayed rather than the call status menu, actuating the selection soft key 12 activates or selects the highlighted option in that sub-menu, as designated by the function indicator 31 at the bottom of the display 5 just above the selection key 12 where the word "select" appears when a sub-menu of options specific to a call is displayed.

In FIG. 4B, the same partial view of the telephone illustrated in FIG. 3B is shown following actuation of the option key 12. It can now be seen that the screen displays a sub-menu of options specific to the waiting call 25 from "David Brown". In this example, the options "Forward"; "Answerphone" and "Voicemail" are options specific to a waiting call. It will be appreciated that the option to "reject" waiting call does not appear in the list of sub-menu options as this feature is quickly accessed by actuating the selection soft key 12, as previously described. Other options which are relevant to operations of the telephone 1 rather than call handling options also appear in the list of sub-menu options and examples of these are as follows: "drop all calls"; "main menu"; "audio filter"; "whisper" and "mute". It will be appreciated that, as with the answered call 24 from "John Smith", all the sub-menu options for the waiting call 25 from "David Brown" fit on a single screen shot and there is no need to actuate the scroll key 9 to find a required option not shown on the display 5. On the contrary, the scroll key 9 is only used to highlight a visible chosen option. Furthermore, the user knows exactly which options apply to which call as the name and status of the caller 25 remains at the top of the display 5 when the sub-menu is displayed. Actuating the soft key 12 will now "select" the highlighted option in the call specific menu as indicated by function designator 31.

Figure 5A:
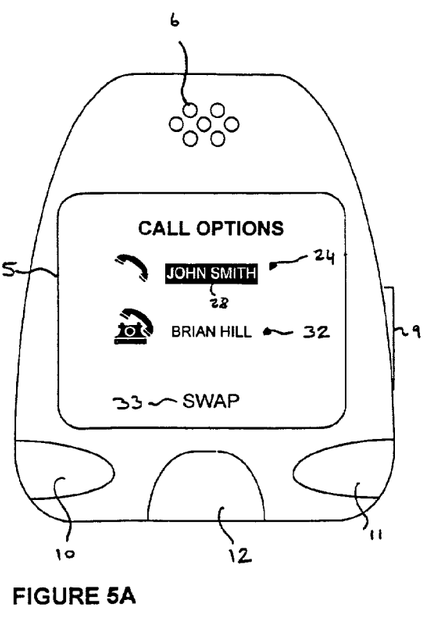
FIGS. 5A and 5B illustrate a partial view of the front casing of the mobile telephone shown in FIG. 1 showing a typical screen display when there is a pending answered call and held call, the answered call being highlighted in FIG. 5A and the unanswered call being highlighted in FIG. 5B.
Figure 5B:
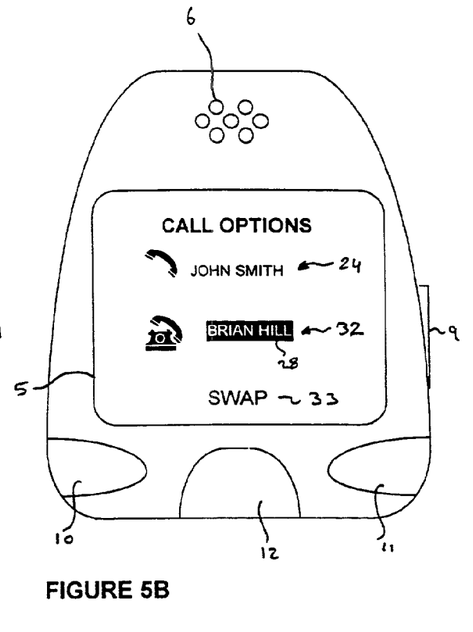

Referring now to FIGS. 5A and 5B, there is shown a partial view of the front casing of the mobile telephone on which is shown a call status screen listing an answered call 24 from "John Smith" and an answered but held call 32 from "Brian Hill". It can be seen that the answered 24 call from "John Smith" has the highlight bar 28 positioned over it in FIG. 5A and the held call from "Brian Hill" has the highlight bar 24 positioned over it in FIG. 5B.

The function of the selection key 12 when there is a pending answered call and a pending held call is "Swap", as indicated by the function indicator 33 at the foot of the display 5. In this case, the function is the same irrespective of whether the answered or held call is highlighted with the highlight bar 28. The "swap" function of the selection key 12 enables a user to switch between the active answered call 24 and the held call 32 at the press of a single key 12.

Figure 6A:
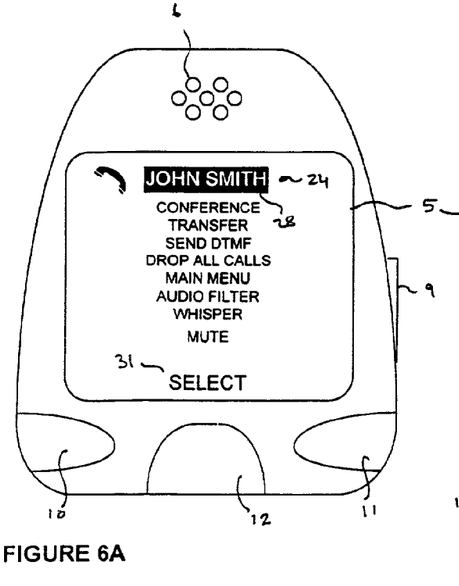
FIG. 6A shows the same view as FIG. 5A following activation of the "option key"

FIG. 6A shows the same partial view of the telephone illustrated in FIG. 5A, except that the option key 11 has now been actuated. It can now be seen that the display 5 shows a call specific menu of options relating to the answered call 24 from "John Smith" when there is another call 32, in this case from "Brian Hill" on hold. In the present example, the list of options includes "Conference; "Transfer"; "Send DTMF"; Drop All Calls" and "Main Menu" and some more commonly used features which are options which apply to the telephone rather than to call handling, such as "Audio Filter"; Whisper" and "Mute".

Figure 6B:
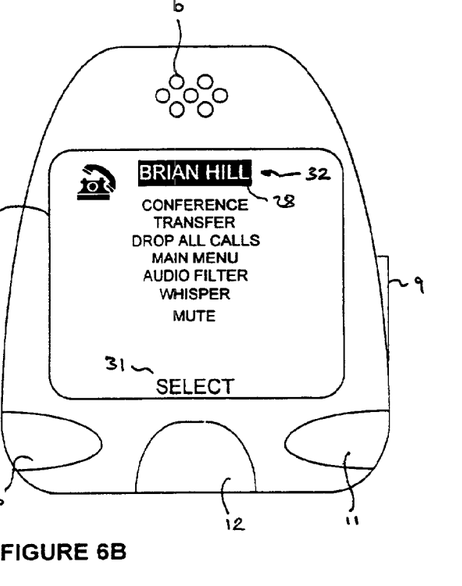
FIG. 6B shows the same view as FIG. 5B following activation of the "option key"

FIG. 6B shows the same partial view of the telephone illustrated in FIG. 5B, except that the option key 11 has now been actuated. It can now be seen that the display 5 shows a call specific menu of options relating to the held call 32 from "Brian Hill". In the present example, the list of options includes "Conference"; Transfer"; "Drop All Calls" and "Main Menu". Other options that apply more to the functions of the telephone rather than to call handling such as "Audio Filter"; "Whisper" and "Mute" also appear in the call specific menu.

As described above with reference to FIGS. 3 and 4, once the sub-menu is displayed, the user may activate a particular function by pressing the scroll key 9 to move the highlight bar 28 over the required option and by pressing the selection key 12. It will be apparent that when a sub-menu of specific call options is displayed rather than the call status menu, actuating the selection soft key 12 activates or selects the highlighted option in that sub-menu, as designated by the function indicator 31 at the bottom of the display 5 just above the selection key 12 where the word "select" appears when a sub-menu of options specific to a call is displayed.

Figure 7A:
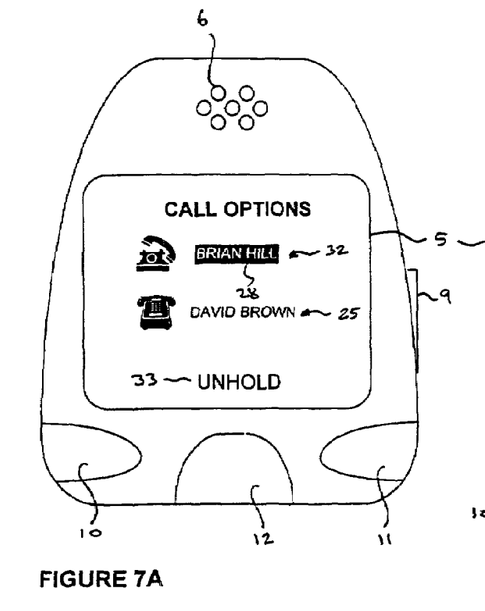
FIGS. 7A and 7B illustrate a partial view of the front casing of the mobile telephone shown in FIG. 1 showing a typical screen display when there is a pending held call and a waiting call, the held call being highlighted in FIG. 7A and the waiting call being highlighted in FIG. 7B.
Figure 7B:
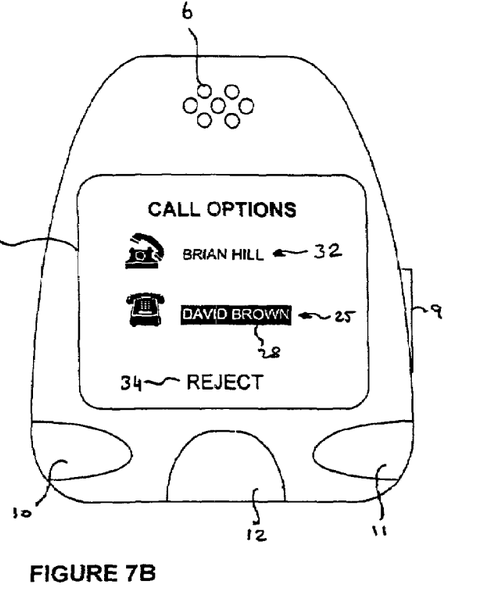

Referring now to FIGS. 7A and 7B, there is shown a partial view of the front casing of the mobile telephone on which is shown a call status screen listing a held call 32 from "Brian Hill" and a waiting call 25 from "David Brown". It can be seen from FIG. 7A that the held call 32 has the highlight bar 28 positioned over it and the waiting call 25 has the highlight bar 28 positioned over it in FIG. 7B.

The function of the selection key 12 when there is a pending held call and a pending waiting call is "Unhold" when the held call 32 is highlighted and "Reject" when the waiting call 25 is highlighted, as indicated by the function indicators 33,34 in FIGS. 7A and 7B respectively. This enables a user to answer a held call and reject a waiting call quickly.

Figure 8A:
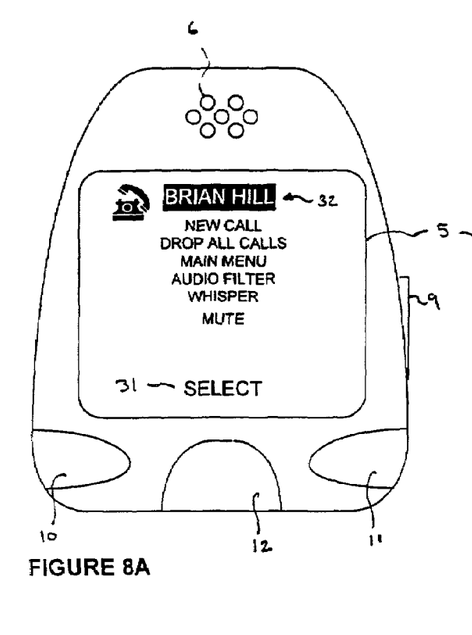
FIG. 8A shows the same view as FIG. 7A following activation of the "option key"

FIG. 8A shows the same partial view of the telephone 1 illustrated in FIG. 7A, except that the option key 11 has been activated. It can now be seen that the display 5 shows a call specific menu of options relating to the held call 32 from "Brian Hill" when there is another call 25, in this case from "David Brown", which is a waiting call. In the present example, the list of options appearing on the call specific menu includes "New Call"; "Drop All Calls" and "Main Menu" and some more commonly used features which are options which apply to the telephone rather than to call handling, such as "Audio Filter"; Whisper" and "Mute".

Figure 8B:
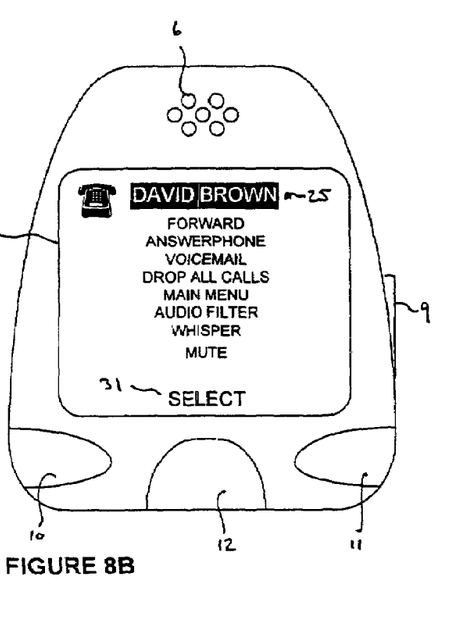
FIG. 8B shows the same view as FIG. 7B following activation of the "option key"

FIG. 8B shows the same partial view of the telephone 1 illustrated in FIG. 7B, except that the option key 11 has now been activated. It can now be seen that the display 5 shows a call specific menu of options relating to the waiting call 25 from "David Brown". In the present example, the list of options includes "Forward"; "Answerphone"; "Voicemail"; "Drop all calls" and "Main Menu". Other options that apply more to the functions of the telephone rather than to call handling such as "Audio Filter"; "Whisper" and "Mute" also appear in the call specific menu.

Figure 9A:
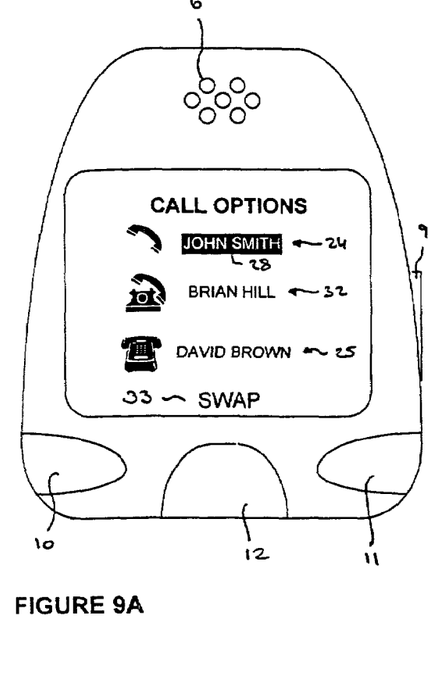
FIGS. 9A, 9B and 9C illustrate a partial view of the front casing of the mobile telephone shown in FIG. 1 showing a typical screen display when there is a pending answered call, a held call and an unanswered waiting call, the answered call being highlighted in FIG. 9A, the held call being highlighted in FIG. 9B, and the waiting call being highlighted in FIG. 9C.
Figure 9B:
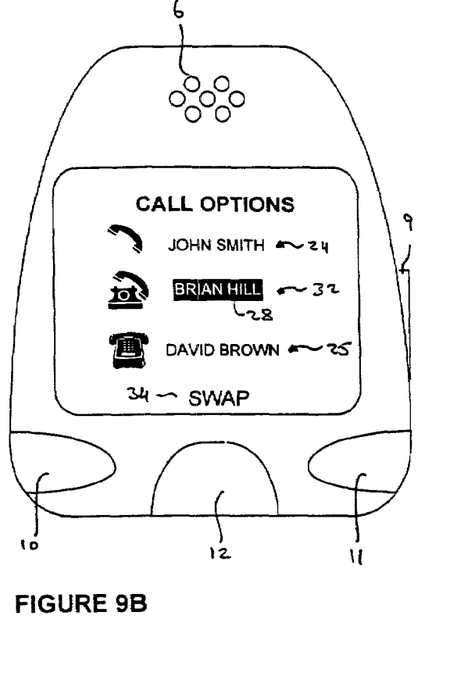
Figure 9C:
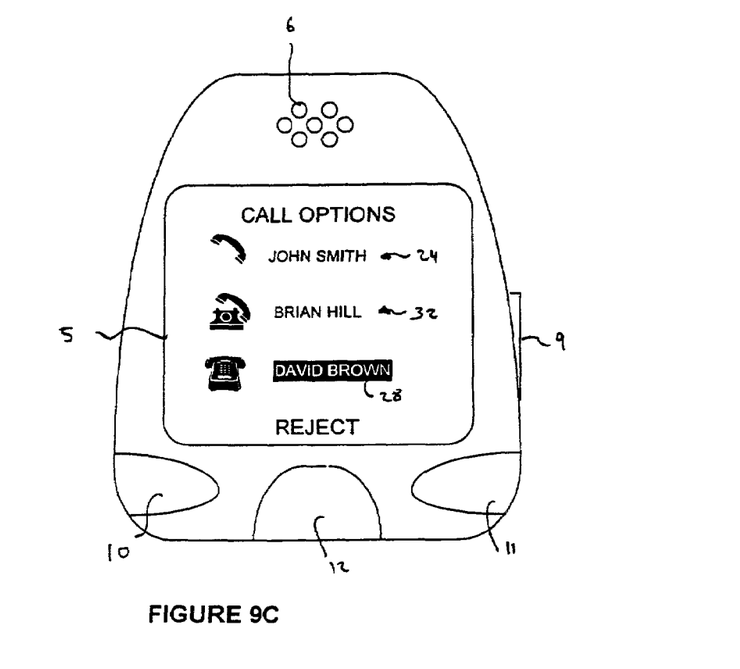

Finally, referring to FIGS. 9A, 9B and 9C, there is shown a partial view of the front casing of the mobile telephone on which is shown a call status screen listing an answered call 24 from "John Smith", a held call 32 from "Brian Hill" and a waiting call 25 from "David Brown". It can be seen that the answered call 24 from "John Smith" has the highlight bar 28 positioned over it in FIG. 9A, the held call 32 from "Brian Hill" has the highlight bar 28 positioned over it in FIG. 9B, and the waiting call 25 from "David Brown" has the highlight bar 28 positioned over it in FIG. 9C.

The function of the selection key 12 when there is a pending answered call 24, a pending held call 32 and a pending waiting call 25 when the answered call 24 or the held call 32 is highlighted is "Swap", as indicated by the function indicator 35 at the foot of the display 5 in FIGS. 9A and 9B. The function of the selection key 12 when there is a pending answered call 24, a pending waiting call 25 and a pending held call 32, and the waiting call 25 is highlighted is "Reject" as indicated by the function indicator 36 in FIG. 9C.

Figure 10A:
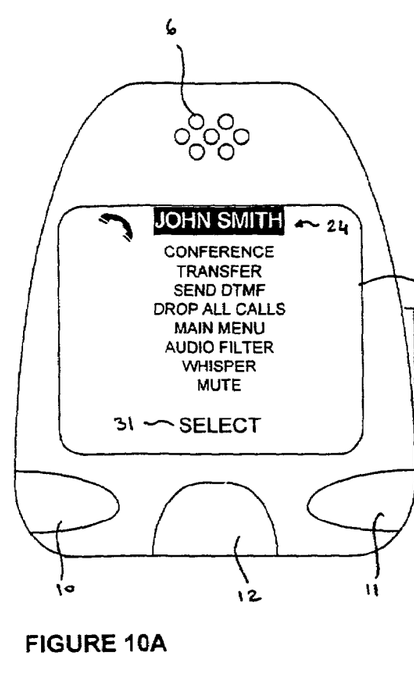
FIG. 10A shows the same view as FIG. 9A following activation of the "option key"

FIG. 10A shows the same partial view of the telephone illustrated in FIG. 9A, except that the option key 11 has been activated. It can now be seen that the screen displays a call specific menu of options relating to the answered call 24 from "John Smith" when there is two other calls 25,32, one from "Brian Hill" on hold and the other from "David Hill" which is waiting. In the present example, the list of options includes "Conference; "Transfer"; "Send DTMF"; Drop All Calls" and "Main Menu" and some more commonly used features which are options which apply to the telephone rather than to call handling, such as "Audio Filter"; Whisper" and "Mute".

Figure 10B:
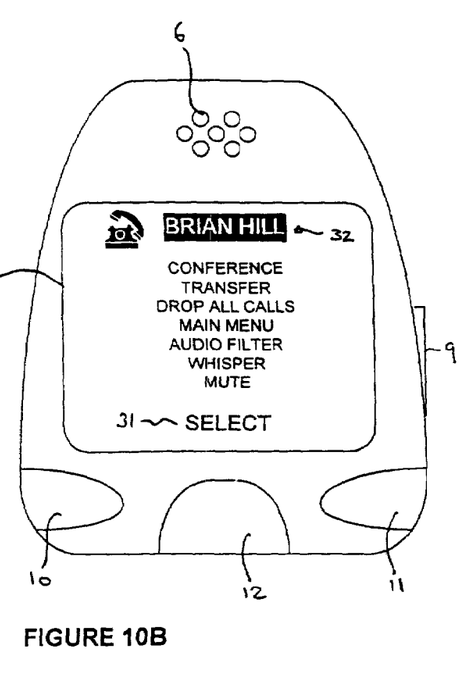
FIG. 10B shows the same view as FIG. 9B following activation of the "option key"

FIG. 10B shows the same partial view of the telephone illustrated in FIG. 9B, except that the option key has now been activated. It can now be seen that the display 5 shows a call specific menu of options relating to the held call 32 from "Brian Hill" when there is two other pending calls 24,25, one answered and one waiting. In the present example, the list of options includes "Conference"; Transfer"; "Drop All Calls" and "Main Menu". Other options that apply more to the functions of the telephone rather than to call handling such as "Audio Filter"; "Whisper" and "Mute" also appear in the call specific menu.

Figure 10C:
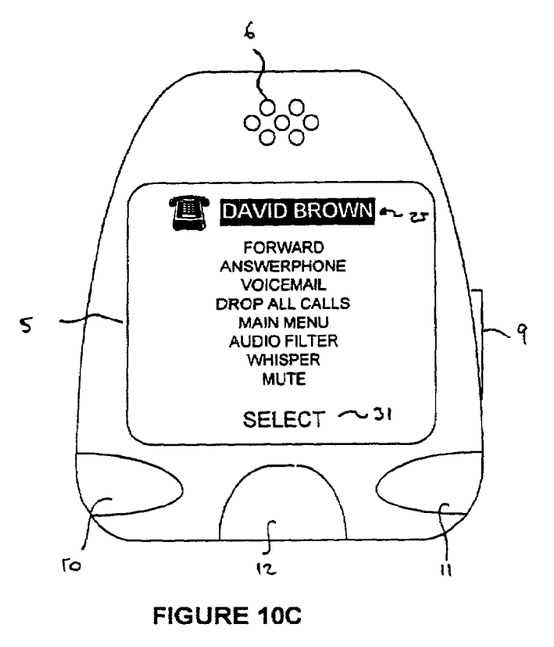
FIG. 10C shows the same view as FIG. 9C following activation of the "option key"

FIG. 10C shows the same partial view of the telephone illustrated in FIG. 9C, except that the option key 11 has now been activated. It can now be seen that the display 5 shows a call specific menu of options relating to the waiting call 25 from "David Brown", when there are two other pending calls 24,32, one answered and one on hold. In the present example, the list of options includes "Forward"; Answerphone"; "Voicemail"; Drop all calls" and "Main menu". Other options that apply more to the functions of the telephone 1 rather than to call handling such as "Audio filter"; "Whisper" and "Mute" also appear in the call specific menu.

Once the sub-menu is displayed, the user may activate a particular function by pressing the scroll key 9 to move the highlight bar 28 over the required option and by pressing the selection key 12. It will be apparent that when a sub-menu of specific call options is displayed rather than the call status menu, actuating the selection soft key 12 activates or selects the highlighted option in that sub-menu, as designated by the function indicator 31 at the bottom of the display 5 just above the selection key 12 where the word "select" appears when a sub-menu of options specific to a call is displayed.

Figure 11A:
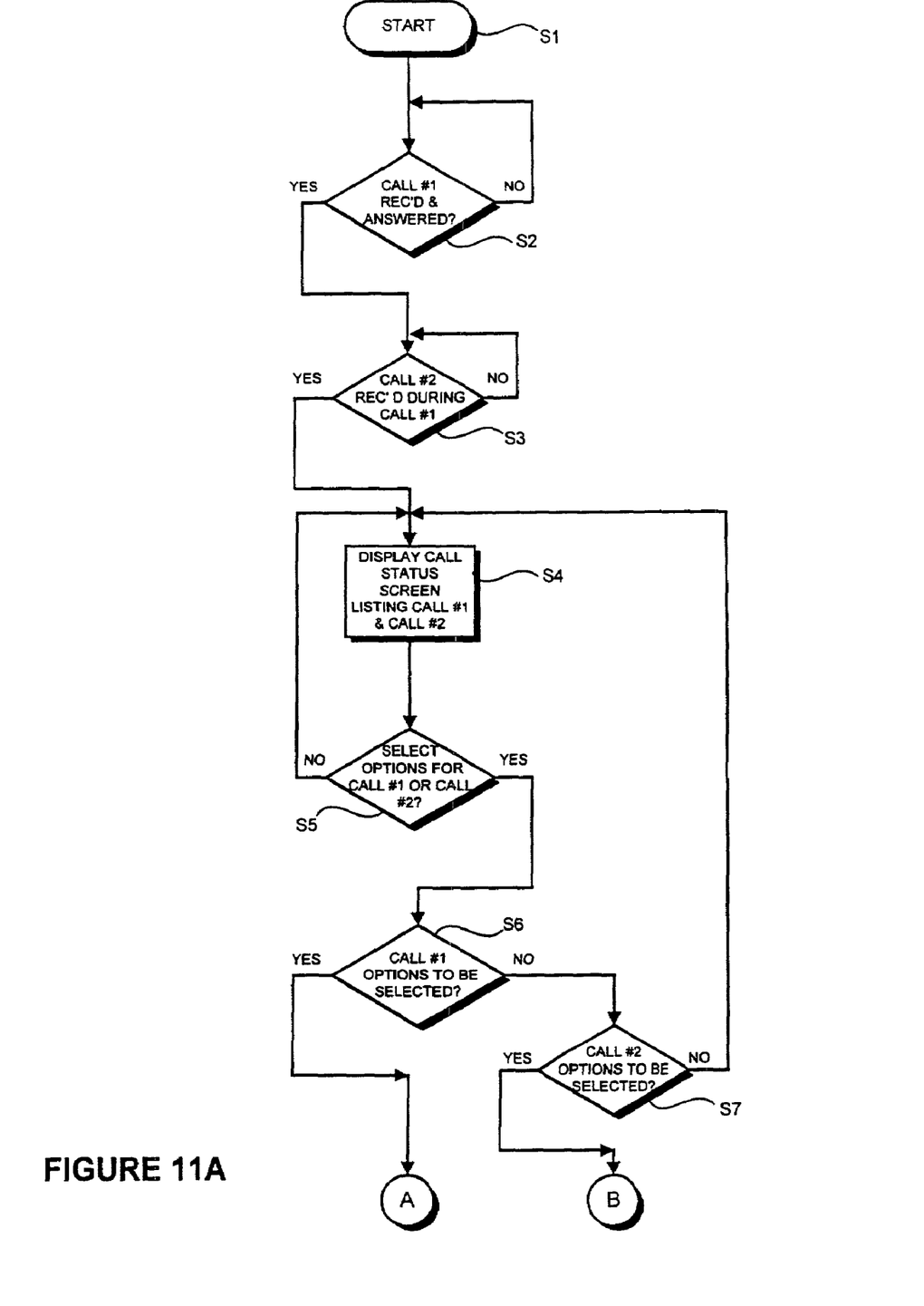
FIGS. 11A to 11C are flowcharts showing the sequence of steps involved in handling two calls, Call #1 being an answered call and Call #2 being a waiting call.
Figure 11B:
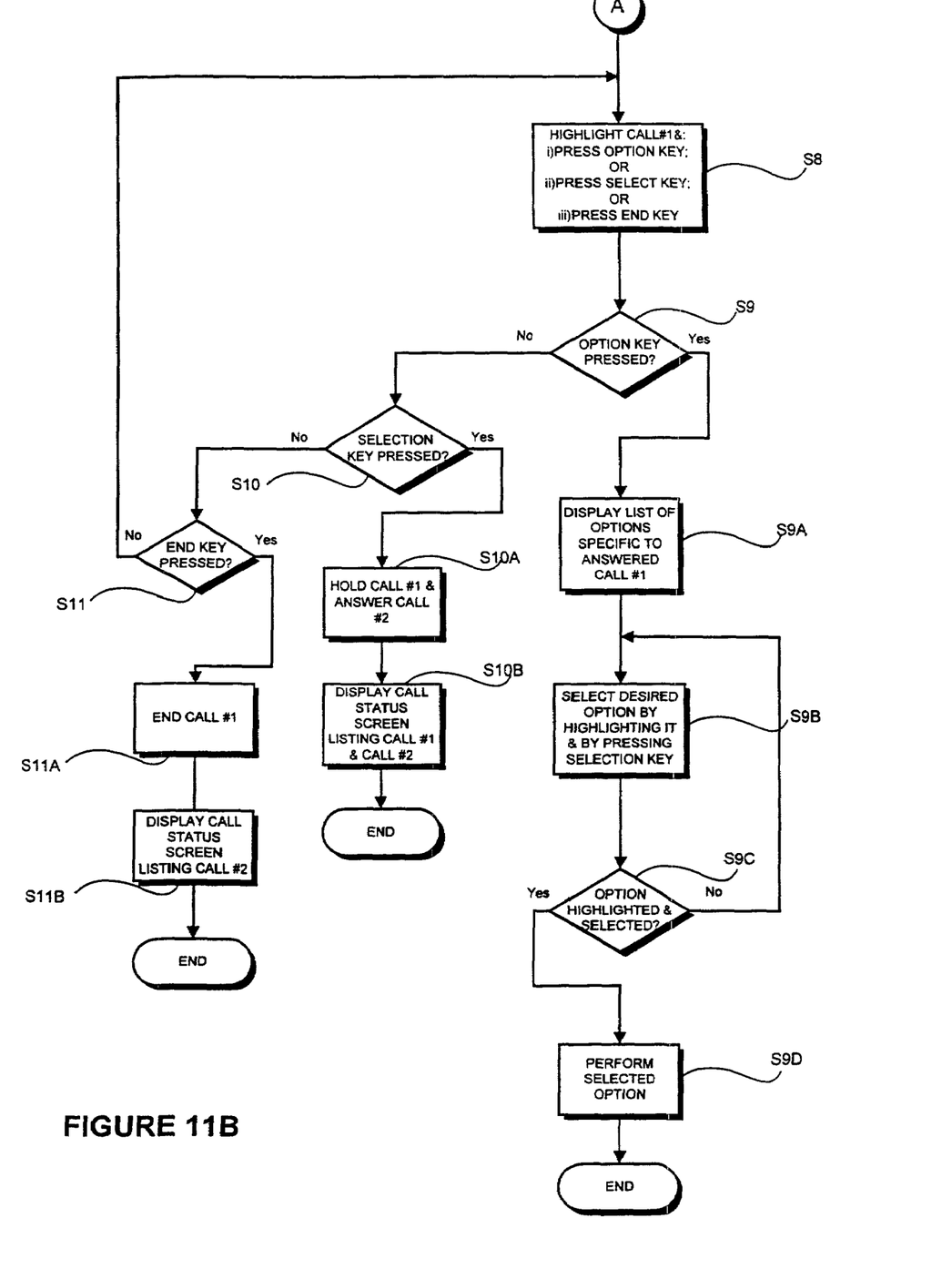

FIGS. 11A to 11C show flowcharts which will now be used to describe how the call handling system of the invention would work in practice. In this example, a sequence of steps in the operation of a mobile telephone is shown when one call (Call #1) is answered and a second call is received and waiting (Call #2) during the first. The procedure starts (Step S1) and waits for a first call (Call #1) to be received and answered (Step S2). If Call #1 is answered, then the telephone waits until a second call (Call #2) is received whilst the first call is active (Step S3). If Call #2 is waiting, a call status screen is displayed on the display 5 listing active Call #1 and waiting Call #2 (Step S4). The user can then select a particular call handling option for a specific call (Step S5). If options for Call #1 are to be selected (Step S6) (the flowchart continues in FIG. 11B), the user actuates the scroll key 9 to move the highlight bar 28 over Call #1 (Step S8). The user can then press the option key 11 (Step S9), the selection key (Step S10), or the end key (Step S11).

If Step S9 is followed and the option key 11 is actuated, a sub menu of specific call options relating to Call #1 appears on the display (Step S9A). The user can now select one of the listed options by highlighting it using the scroll key 9 and by actuating the selection key 12 (Step S9B). If an option is selected (Step 9C), it is then carried out (Step S9D).

If Step S10 is followed and the selection key 12 is actuated, Call #1 is held and Call #2 is answered (Step S10A). The call status screen listing held Call #1 and active Call #2 is then displayed on the display 5 (Step S10B).

If Step S11 is followed and the "end" key is actuated, Call #1 is ended (Step S11A). The call status screen is then displayed listing only Call #2 (Step 11B).

If options for Call #2 are to be selected (Step S7) (the flowchart continues in FIG. 11C), the user actuates the scroll key 9 to move the highlight bar 28 over Call #2(Step S12). The user can then press the option key 11 (Step S13) or the selection key (Step S14).

Figure 11C:
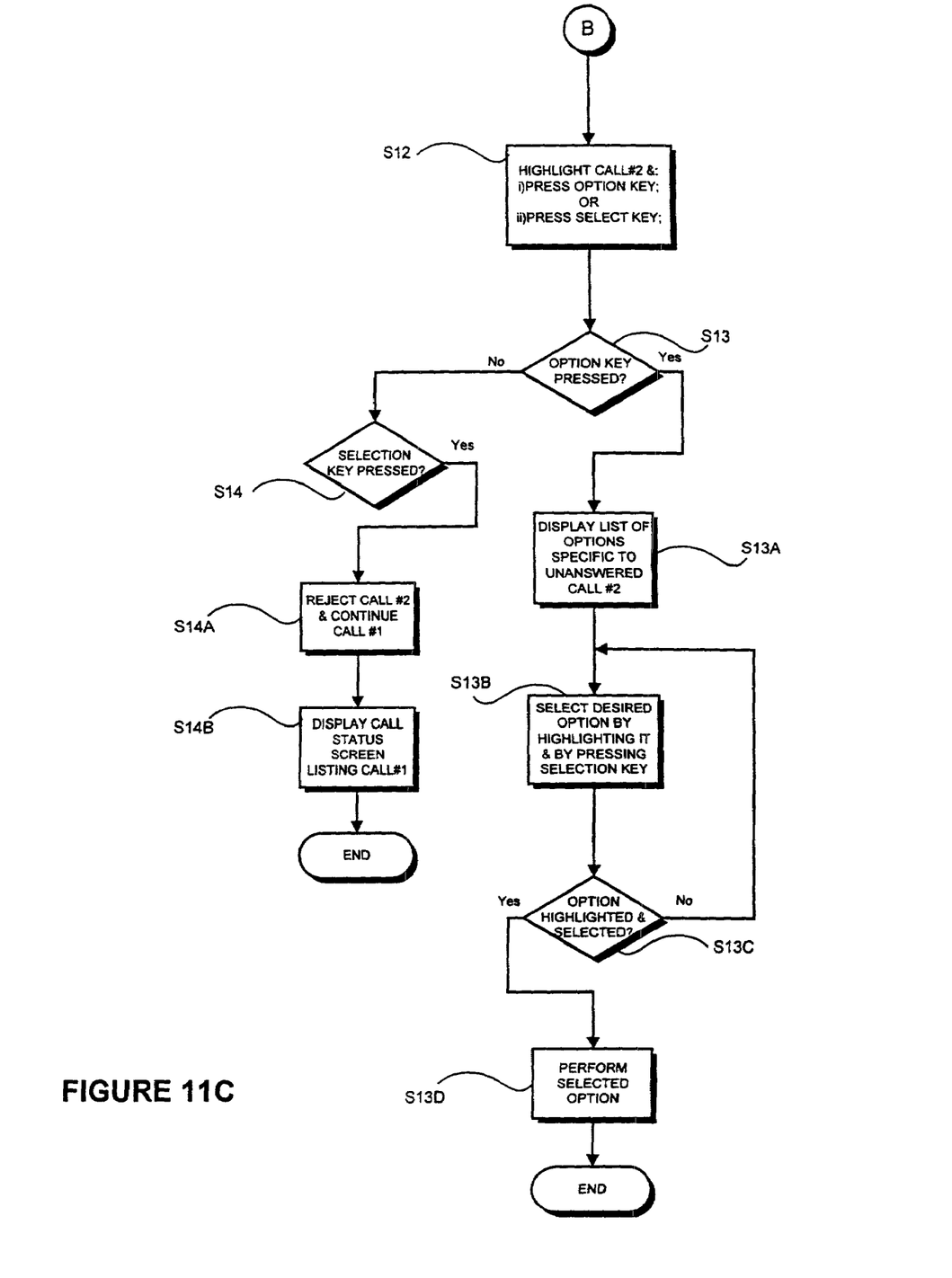

If Step S13 is followed and the option key 11 is actuated, a sub menu of specific call options relating to Call #2 appears on the display (Step S13A). The user can now select one of the listed options by highlighting it using the scroll key 9 and by actuating the selection key 12 (Step S13B). If an option is selected (Step 13C), it is then carried out (Step S13D).

If Step S14 is followed and the selection key 12 is actuated, waiting Call #2 is rejected and Call #1 is continued (Step S14A). The call status screen listing Call #1is then displayed on the display 5 (Step S14B).

It will be appreciated that the foregoing flowcharts have been used to describe the sequence of events when there is an active answered call and a waiting call. However, it will be appreciated that there might also be a held call, or some other combination of active, waiting, held and data calls, all of which can be handled in a similar sequence of steps.

Many modifications and variations of the invention falling within the terms of the following claims will be apparent to those skilled in the art and the foregoing description should be regarded as a description of the preferred embodiments only.

The invention claimed is:

1. A mobile telecommunications device including a display and a control unit configured to show a list of pending calls on the display for multiple call handling simultaneously during in-call operation, wherein the mobile telecommunications device is receiving or initiating the pending calls, and said list includes at least two calls being selectable by a user, and upon selection of one of said at least two calls, the control unit displays an option for handling the call and an option for displaying a sub-menu listing call handling options specific to the selected call.

2. A mobile telecommunications device according to claim 1, wherein the list of options in a sub menu changes depending on the status of the selected call.

3. A mobile telecommunications device according to claim 1 wherein the list of options in a sub-menu changes depending on the status of the unselected pending calls.

4. A mobile telecommunications device according to claim 1, wherein the call selected from the menu is identified on the sub-menu adjacent the list of options associated with the selected call.

5. A mobile telecommunications device according to claim 4, wherein the control unit is configured to display the status of the selected call in the sub-menu.

6. A mobile telecommunications device according to claim 1, wherein the control unit is configured to display the status of each pending call in the menu.

7. A mobile telecommunications device according to claim 1, wherein the control unit includes a scroll key and an option key configured such that the user can highlight a pending call in the menu using the scroll key and select said highlighted call by pressing the option key.

8. A mobile telecommunications device according to claim 7, wherein the control unit includes a selection key having a function dependent on the status of the highlighted call when the menu of pending calls is displayed.

9. A mobile telecommunications device according to claim 8, wherein the function associated with the selection key may be performed by actuating the selection key after highlighting a call in the menu and before selecting that call to display a sub-menu listing call handling options associated with the selected call.

10. A mobile telecommunications device according to claim 7, wherein the control unit includes a selection key having a function dependent on the status of other pending calls when the menu of pending calls is displayed.

11. A mobile telecommunications device according to claim 1, comprising a mobile telephone.

12. A mobile telecommunications device according to claim 1 comprising:
a plurality of call handling keys; and wherein
the call handling keys are operated to signal the control unit to select one of the at least two calls and thereafter to activate further actions to be taken by the control unit.

13. A mobile telecommunications device according to claim 12 wherein:
one of the call handling keys is operated to end the selected one of the at least two calls.

14. A method of handling multiple calls in a mobile telecommunications device including a display and a control unit comprising showing a list of pending calls on the display for multiple call handling simultaneously during in-call operation, wherein the mobile telecommunications device is receiving or initiating the pending calls, and said list including at least two calls being selectable by a user, selecting of one of said at least two calls, and the control unit controlling display of an option for handling the call and an option for displaying a sub-menu listing call handling options specific to the selected call.

15. A method according to claim 14, wherein the control unit includes a scroll key and the step of selecting a pending call from the menu includes operating the scroll key to highlight a call in the menu.

16. A method according to claim 15, wherein the control unit includes an option key and the step of selecting a call from the menu includes operating the option key to display the sub-menu listing call handling options associated with the highlighted call.

17. A method according to claim 14, wherein the control unit includes a selection key having a function dependent on the status of the highlighted call when the menu of pending calls is displayed, the method including the step of actuating the selection key after highlighting a call in the menu to perform said function and before selecting that call to display a sub-menu listing call handling options associated with the selected call.

18. A computer including a memory and a microcontroller, the memory storing a program executable by the microcontroller to carry out the method of call handling according to claim 14.

19. A method in accordance with claim 14 comprising:
the mobile telecommunication device comprises a plurality of call handling keys; and wherein
the call handling keys are operated to signal the control unit to select one of the at least two calls and thereafter to activate further actions to be taken by the control unit.

20. A method in accordance with claim 19 wherein:
one of the call handling keys is operated to end the selected one of the at least two calls.

* * * * *